(12) United States Patent
Vaughan (10) Patent No.: US 9,079,783 B2
(45) Date of Patent: Jul. 14, 2015

(54) DISTRIBUTOR ARRANGEMENT FOR A FLUID TREATMENT TANK

(71) Applicant: Clack Corporation, Windsor, WI (US)

(72) Inventor: Don Vaughan, Waunakee, WI (US)

(73) Assignee: Clack Corporation, Windsor, WI (US)

( * ) Notice: Subject to any disclaimer, the term of this patent is extended or adjusted under 35 U.S.C. 154(b) by 104 days.

(21) Appl. No.: 13/836,448

(22) Filed: Mar. 15, 2013

(65) Prior Publication Data
US 2014/0263067 A1  Sep. 18, 2014

(51) Int. Cl.
*C02F 1/00* (2006.01)
*C02F 1/42* (2006.01)

(52) U.S. Cl.
CPC .. *C02F 1/006* (2013.01); *C02F 1/42* (2013.01)

(58) Field of Classification Search
USPC .......................... 210/263, 266, 275, 279, 283
See application file for complete search history.

(56) References Cited

U.S. PATENT DOCUMENTS

| | | | |
|---|---|---|---|
| 3,951,811 A * | 4/1976 | Casolo et al. ................. 210/281 |
| 4,193,868 A * | 3/1980 | Meyers .......................... 210/678 |
| 5,064,534 A * | 11/1991 | Busch et al. ................... 210/266 |
| 5,066,393 A * | 11/1991 | Padera et al. .................. 210/136 |
| 5,250,187 A * | 10/1993 | Franks ............................ 210/661 |
| 5,658,459 A * | 8/1997 | Guttormsen ................... 210/279 |
| 2009/0166273 A1* | 7/2009 | Mormino et al. ............. 210/107 |
| 2011/0303603 A1* | 12/2011 | Field .............................. 210/292 |
| 2014/0263076 A1* | 9/2014 | Vaughan ....................... 210/678 |

* cited by examiner

*Primary Examiner* — Chester Barry
(74) *Attorney, Agent, or Firm* — Boyle Fredrickson, S.C.

(57) ABSTRACT

A distributor plate for a resin tank of a fluid treatment device such as a water softener includes a central hub, an outer ring, a plurality of ribs extending between the hub and the ring and dividing the distributor plate into discrete segments, and a slotted plate connected therebetween. The distributor plate separates the resin bed from a lower end of the resin tank. The distributor plate further comprises at least one valve plate coupled to an underside of the distributor plate over at least one segment thereof. The valve plate is constructed from a material configured to float in the fluid being treated and is movable between a raised position during upflow and a lowered position during downflow. In this manner, the valve plate acts like a check valve to regulate the manner in which fluid flows through the distributor plate during upflow and downflow, improving resin scrubbing during upflow.

20 Claims, 5 Drawing Sheets

DISTRIBUTOR ARRANGEMENT FOR A FLUID TREATMENT TANK

BACKGROUND OF THE INVENTION

1. Field of the Invention

The invention generally relates to fluid treatment tank distributor plates and, more particularly, to a distributor plate including a number of valve plates configured to selectively permit relatively unobstructed fluid flow through the distributor plate during downflow operation of the fluid treatment device and to restrict or prohibit flow through portions of the distributor plate during upflow operation.

2. Discussion of the Related Art

Water softeners are widely used for removing calcium and other deposit causing materials from so-called "hard-water." The typical water softener relies on an ion exchanges process taking place in an ion-exchange resin bed stored in a resin tank or pressure vessel of the water softener. As the water to be processed passes through the resin-filled tank, ions of calcium and other minerals in the water are exchanged with ions found in the resin, e.g., sodium, thereby removing objectionable ions from the water and exchanging them for less objectionable ions from the resin.

In addition to having dissolved ionic contaminants that are removed by water softeners, untreated water also often contains particulate matter which must be mechanically filtered. Sometimes ion exchange resin performs the dual functions of exchanging ions and mechanical filtering. Sometimes specific filter beds are used with no ion exchange properties. These dual-function ion exchange beds and pure filter beds require aggressive mechanical scrubbing to remove the accumulated participates.

The capacity of the resin to exchange ions is finite and is reduced during the ion exchange process. If measures are not taken to regenerate the resin by replacing the undesirable ions with desirable ions, the ion exchange capacity of the resin will become exhausted. Water softeners are typically configured to periodically regenerate the ion exchange resin stored in the resin tank. Regeneration typically involves chemically replacing the objectionable ions such as calcium ions from the resin with less objectionable ions such as sodium ions. The replacement is usually performed by introducing a regenerant solution of sodium chloride or potassium chloride into the resin bed from a brine tank and thereafter flushing the regenerant solution from the bed. Regeneration of a water softener resin bed is sometimes accomplished in a direction that is co-current with the flow of water to be treated (often referred to as "downflow regeneration" or "service flow") and is sometimes accomplished in a direction countercurrent to the flow of the water being treated (often referred to as "upflow regeneration" or "backwash flow"). The resin bed is typically backwashed in order to remove trapped particulate matter, and the resin tank can be rinsed to remove objectionable soluble materials. In order to prevent interruption of service, most water softeners are configured to allow bypass of untreated water directly to the service lines during backwash, rinse, and regeneration.

Resin tanks typically include a distributor plate (also known as a diffuser plate) positioned within the tank and supporting the resin bed. The typical distributor plate is slotted to allow bidirectional flow therethrough. However, most water softener system distributor plates are configured to favor service flow or downflow. This results in a system in which the backwash flow or upflow is relatively inefficient because the bed is evenly fluidized, and only very minimal scrubbing takes places.

Measures have been proposed to enhance scrubbing during backwash. The most widely known is the Autotrol/Osmonics/GE/Pentair turbulator. The turbulator includes a check valve in the normal riser tube/distributor combination of a resin tank that diverts backwash water through a duck bill check valve and up a tube mounted parallel to the main riser tube. This secondary tube is open at the bottom end, which is positioned about 0.5 inches above the top of the duck bill check valve. At the top of the secondary tube is another check valve which prevents water from flowing back down the secondary tube. This additional check valve is positioned slightly below the top of the ion exchange resin or other media in the tank.

In operation, backwash water is diverted through the duck bill check, jetting up the secondary tube and carrying resin with it. This resin plumes out of the cage surrounding an additional third check valve and settles back down through the bed to repeat the cycle. The motion cleans the resin better than the gentle floating action of a normal backwash.

Turbulators work reasonably well but cannot be used with an abrasive filter media. They also cannot be used with a bed having gravel under the resin or "gravel under-beds." Because a gravel under-bed cannot be used, a portion of the ion exchange media must act as an under-bed and is not available for ion exchange. The efficiency of the water softener is reduced by the percentage of unused resin. In addition, the duck bill check valve is in the resin and is prone to plugging with resin and allowing resin migration into the plumbing lines. It is also subject to attack by chlorine and chloramines, and resin will enter the plumbing lines if it fails. Moreover, the check valve at the top of the secondary tube is prone to plugging with resin, causing a bypass path around the resin bed. This bypass results in premature discharge of hard water.

Another method of improving scrubbing during backwash flow has been to employ a distributor plate including a number of angled slots. The angled slots are configured to attempt to impart a spinning action to the upflowing water to thereby increase the scrubbing during backwash. However, such systems are generally ineffective because the flow velocity of fluids exiting the slots in the plate is relatively low such that very little, if any, spinning can be developed at typical backwash flow rates.

At least some of these issues are not unique to resin tanks of water conditioning systems but, instead, are of a concern in a variety of fluid treatment systems in which a treatment medium is subject to backwash.

The need therefore exists to provide a distributor plate arrangement that is capable of evenly distributing flow during service flow or downflow through a fluid treatment tank and that is also capable of introducing areas of higher flow during backwash or upflow to improve the scrubbing and cleaning of the treatment medium.

SUMMARY OF THE INVENTION

In accordance with a first aspect of the invention, a fluid treatment system comprises a resin tank defining a resin bed configured to house one or more treatment media, such as resin beads, and the fluid being treated, typically water. A segmented distributor plate is received within the resin tank and separates the treatment media from a lower end of the resin tank. At least one valve plate is coupled to an underside of the distributor plate and covers one or more segments thereof. The valve plate is movable between a raised position in which the valve plate is positioned in a generally abutting relationship with the underside of the distributor plate and a lowered position in which the valve plate is vertically spaced from the distributor plate. Accordingly, during downflow operation of the fluid treatment device, the valve plate is driven downwardly and away from the distributor plate to allow a relatively evenly distributed flow of fluid through the treatment media. On the other hand, during upflow operation of the fluid treatment device, the valve plate is urged upwardly by the upwardly flowing fluid into an abutting relationship with an underside of the distributor plate, at least substantially completely blocking fluid flow through the covered segments.

The distributor plate may include a central hub, an outer ring, and a plurality of ribs extending between the hub and the ring thereby defining a plurality of segments between the respective ribs. A slotted plate may be coupled between the hub, the outer ring, and the ribs such that at least one valve plate is configured to cover one or more of the segments. The valve plate may rest against the ribs in its raised position.

The valve plate may be coupled to the distributor plate by a number of circumferentially spaced pins or the like. The pins may be integrally formed with a portion of the distributor plate such as, for example, the ribs.

The valve plate may be constructed from a material having a specific gravity that is lower than that of the fluid being treated.

In accordance with another aspect of the invention, a method of operating a resin tank of a fluid treatment tank includes lowering one or more valve plates during downflow to enable a relative steady, even flow of fluid from the resin bed to the lower end of the resin tank and raising the valve plate during backwash or upflow to provide a seal over a portion of the distributor plate and increase scrubbing.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Valve plates constructed in accordance with the invention could be used in a variety of systems configured to treat a variety of fluids using any of a number of media. Hence, while preferred embodiments of the invention now will be described in conjunction with a water treatment system, it is to be understood that the invention is not so limited.

Figure 1:
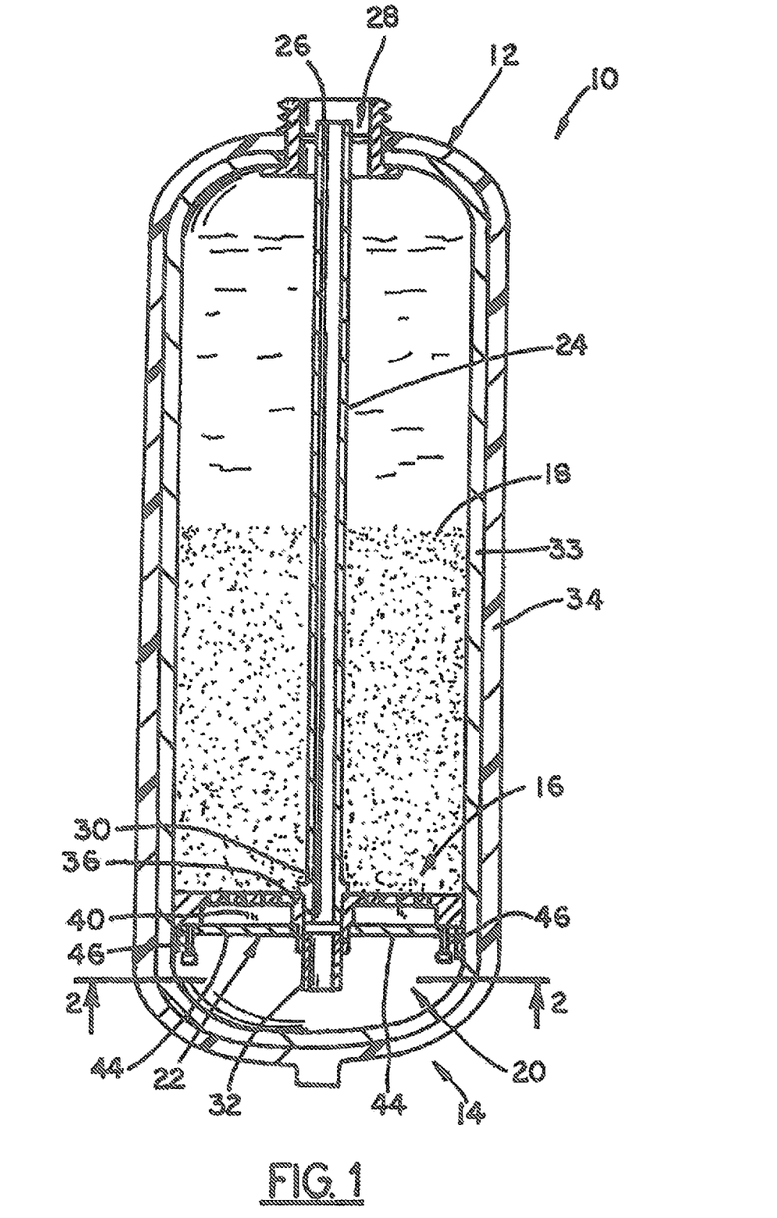
FIG. 1 is a schematic sectional side elevation view of a water softener pressure vessel including a distributor plate including a plurality of valve plates according to an embodiment of the present invention.

Referring now to the drawings and, initially, FIG. 1, a pressure vessel or resin tank 10 for a conventional water treatment system is generally cylindrically shaped, includes an top end 12 opposite a bottom end 14, and defines a resin bed 16 configured to store resin 18 and water therein. One of variety of water treatment systems with which the resin tank 10 is usable is disclosed in U.S. Pat. No. 6,402,944, the contents which are incorporated herein by reference. The resin 18 may be provided in the form of a plurality of plastic, e.g., polystyrene, beads. The bottom end 14 of the resin tank 10 defines a lower end portion 20 separated from the resin bed 16 by a distributor plate 22. A riser tube 24 may be centrally positioned within the tank 10 and includes an upper end 26 that extends through an upper opening 28 of the tank 10 and through which treated water exits the resin tank 10 and is delivered to the, building or other facility or through which hard water may be introduced into the lower end portion 20 of the tank 10 for backwash. Opposite upper end 26 is a lower end 30 mounted on the distributor plate 22. An inlet tube 32, positioned beneath the lower end 30 of the riser tube 24, extends downwardly through the distributor plate 22 in communication with the lower end portion of the tank 10. The tank 10 may include a blow-molded plastic liner 33 reinforced by a layer 34 of fiberglass wrap or the like.

Figure 2:
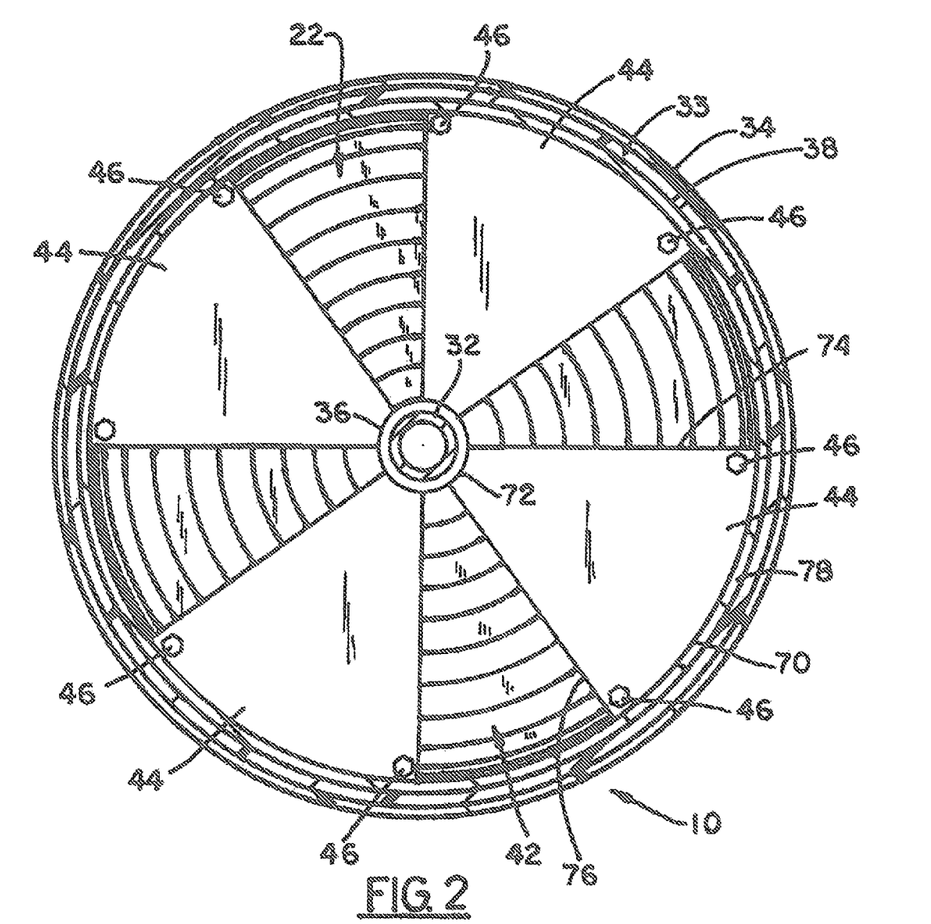
FIG. 2 is a sectional bottom plan view of the water softener pressure vessel of FIG. 1, taken generally along the lines 2-2 in FIG. 1.

With additional reference now to FIG. 2, the distributor plate 22 is shown in additional detail. The distributor plate 22 includes a central hub 36 through which the riser tube 24 and the inlet tube 32 are received, an outer ring 38, a plurality of reinforcing ribs 40 extending at least generally radially from the hub 36 to the outer ring 38, and a slotted plate 42 supported on the ribs 40 and extending from the hub 36 to the outer ring 38. The outer ring 38 may be heat plate bonded or otherwise attached to the inner wall of the liner 33. Each of the components of the distributor plate 22 may be constructed from a single piece of injection molded plastic or any other suitable material. The distributor plate 22 is divided into a plurality of segments defined by the ribs 40. At least one but preferably fewer than all of the segments are covered on the underside with valve plates 44.

Figure 3:
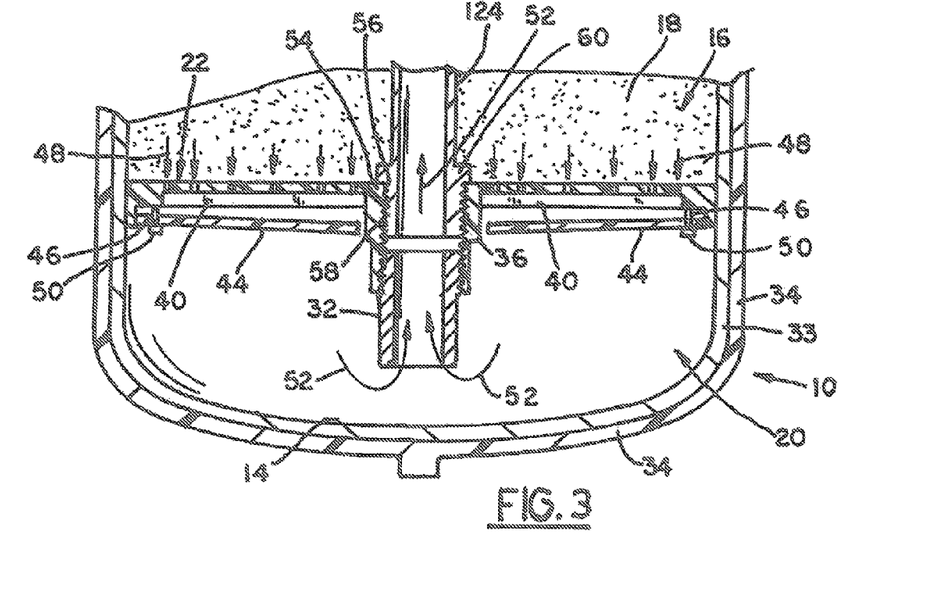
FIG. 3 is a fragmentary sectional side view of a bottom end of the pressure vessel, showing the valve plates in a downflow position in which the valve plates are forced down against heads of pins by fluid flowing downwardly through the distributor plate.
Figure 4:
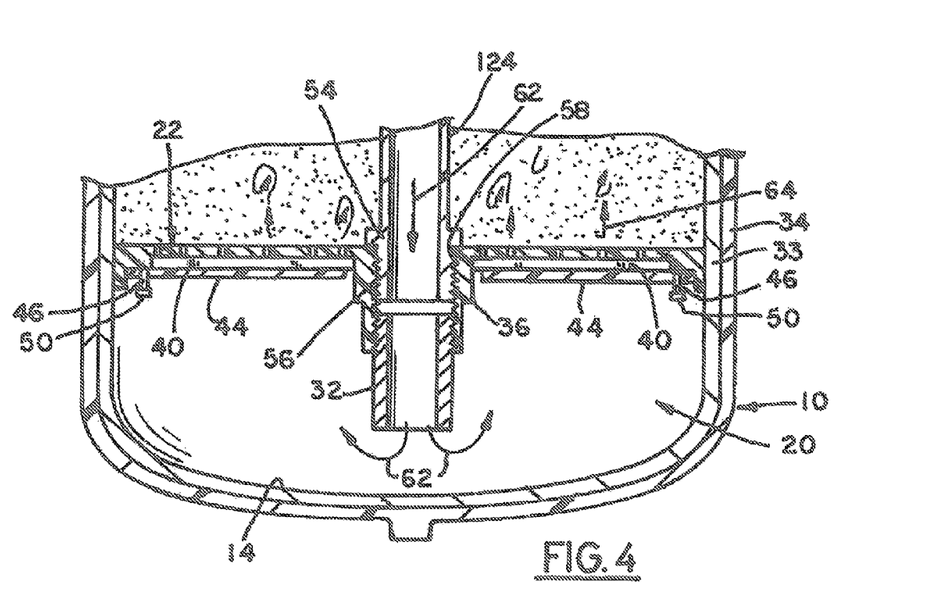
FIG. 4 is a fragmentary sectional side view of the bottom end of the pressure vessel, showing the valve plates in an upflow position.

Referring to FIGS. 3 and 4, the riser tube 24 of this embodiment is threadedly coupled to the distributor plate 22. The hub 36 of the distributor plate 22 includes a flanged portion 54, which extends downwardly from an upper surface of the distributor plate 22. The flanged portion 54 includes a number of threads 56 configured to mate with a corresponding set of threads 58 of the riser tube 24. The inlet tube 32 may likewise be threadedly received in the flanged portion 54 beneath the bottom end of the riser tube 24.

Each valve plate 44 could be of any of a variety of sizes, shapes, and thicknesses so long is moves up into generally sealing contact with the distributor late 22 during upflow conditions and moves down away from the distributor plate during downflow conditions. In a preferred construction of the distributor plate 22, there are a minimum of two valve plates 44 coupled to the underside thereof in a spaced apart-relationship relative to each other. Moreover, the valve plates 44 preferably are evenly distributed around the circumference of the distributor plate 22. Further, the distributor plate 22 should comprise no more than approximately five or six valve plates 44. Moreover, the valve plates 44 preferably occupy between about 20% and 80%, more preferably about 50% about of the total area of the distributor plate 22. The illustrated embodiment has 4 valve plates of identical size and shape distributed evenly around the circumference of the distributor plate 22.

Still referring to FIG. 2, each valve plate 44 of this embodiment is generally wedge-shaped, having outer and inner edges 70 and 72 and first and second side edges 74 and 76. Each valve plate 44 underlies one of the segments of the distributor plate 22 with a sufficient overlap to assure that the valve plate 44 can seal against the ribs 40 bordering the associated distributor plate segment. Each of the outer and inner edges 70 and 72 is positioned closely adjacent to the respective one of hub 36 and the outer ring 38 of the distributor plate 22 and is arcuate with a curvature matching that of the adjacent distributor plate structures 36 or 38. The side edges 74 and 76 are inclined at least generally the same angle as the ribs 40.

The valve plates 44 are generally loosely mounted to the distributor plate 22 to enable relatively easy vertical movement of the valve plates 44 relative to the distributor plate. In this manner, the valve plates 44 operate like a check valve to selectively alter the flow of water between the resin bed 16 and the lower end portion 20 of the resin tank 10 depending on the direction of water flow through the distributor plate 22.

The valve plates 44 of the present embodiment are connected to the distributor plate 22 by a pair of circumferentially spaced pins 46 positioned adjacent the outer ring 38. Each pin has a head and an elongated shaft extending upwardly from the head to the distributor plate. A washer (not shown) or similar spacer may be provided between the valve plate 44 and the head each of the pins 46. The pins 46 may be integrally formed with the distributor plate 22 and, more particularly, may be integrally formed with the ribs 40 by way of molding or any other suitable method. The length of each shaft is set such that, when the valve plates are in their lowered position in which they rest against the heads of the pins 46, a gap is formed between the upper surfaces of the valve plates and the bottom of the ribs 40 that is sufficiently thick to allow relatively unobstructed water flow therebetween. A gap of about 1/10" has been found to be sufficient for these purposes. The valve plates 44 may be coupled to the plate 42 by way of one or more additional pins located radially nearer to the hub 36 or by way of some other mechanism, so long as the valve plates 44 are capable of moving vertically in response to fluid flow through the distributor plate while being restrained from horizontal movement.

The valve plates 44 preferably are constructed of a material having a specific gravity lower than that of the fluid being treated. In the present example in which the fluid being treated is water, the valve plates may, for example, be constructed from, polypropylene, which has a specific gravity of 0.9. As will be described in additional detail hereinafter, the valve plates 44 are configured to float up during backwash to make contact with the ribs 40. The pressure differential due to the backwash enables the valve plates to provide a seal and block flow through the covered segments to affect the flow distribution thereof.

In FIG. 2, the distributor plate 22 is shown as being divided into eight different segments with four of the eight segments being covered by the valve plates 44. Understandably, any number of alternative arrangements may be utilized in carrying out the present invention. That is, the distributor plate 22 may be divided into a lesser or greater number of segments, and the number of valve plates 44 may likewise be lesser or greater. Of course, the number of valve plates 44 need not correspond directly with the number of segments of the distributor plate 22, and thus, there may be a different proportion of valve plates 44 to segments of the distributor plate 22 than what is shown, i.e., 1:1.

With additional reference now to FIGS. 3 and 4, operation of distributor plate 22 according to this embodiment of the present invention is illustrated in additional detail. With momentary reference to FIG. 3, the tank 10 is shown during service or downflow operation. Water in the tank 10 flows through the resin 18 and toward the lower end 20 of the tank as indicated by the arrows 48. As the water flows through the resin 18, an ion exchange occurs to replace the calcium and other undesirable minerals in the water and with sodium received from a brine tank (not shown). The downflow of the water forces the valve plates 44 downwardly against the heads 50 of the pins 46 to thereby open the distributor plate 22 to enable the water to flow into the lower end 20 in a relatively evenly-distributed manner. The water is then forced up into the riser tube 24 from inlet tube 32 as shown by arrows 52 and out of the tank 10 for delivery to the facility serviced by the water softener.

With momentary reference now to FIG. 4, the tank 10 is shown during backwash or upflow operation. During backwash, water is delivered to the lower end 20 of the tank 10 via the riser tube 24 and tube 32 from the untreated water supply, i.e., hard water, as represented by the arrows 62. As the lower end 20 fills with water, the valve plates 44 are driven upwardly against the ribs 40 of the slotted plate 42 of the distributor plate 22. Accordingly, flow through the distributor plate segments covered by the valve plates 44 is restricted or even prevented. Thus, the water flowing upwardly through the distributor plate 22 occurs mainly if not exclusively through the uncovered segments. The resulting uneven flow through the distributor plate 22 results in an uneven flow of water to and through the resin bed 16 as represented by arrows 64. The uneven flow of water through the resin bed 16 increases the relative motion of the resin beads 18 relative to one another to improve the overall scrubbing action therebetween. In this manner, the backwash operation is capable of more efficiently and effectively scrubbing the resin beads 18 of particulate matter.

Figure 5:
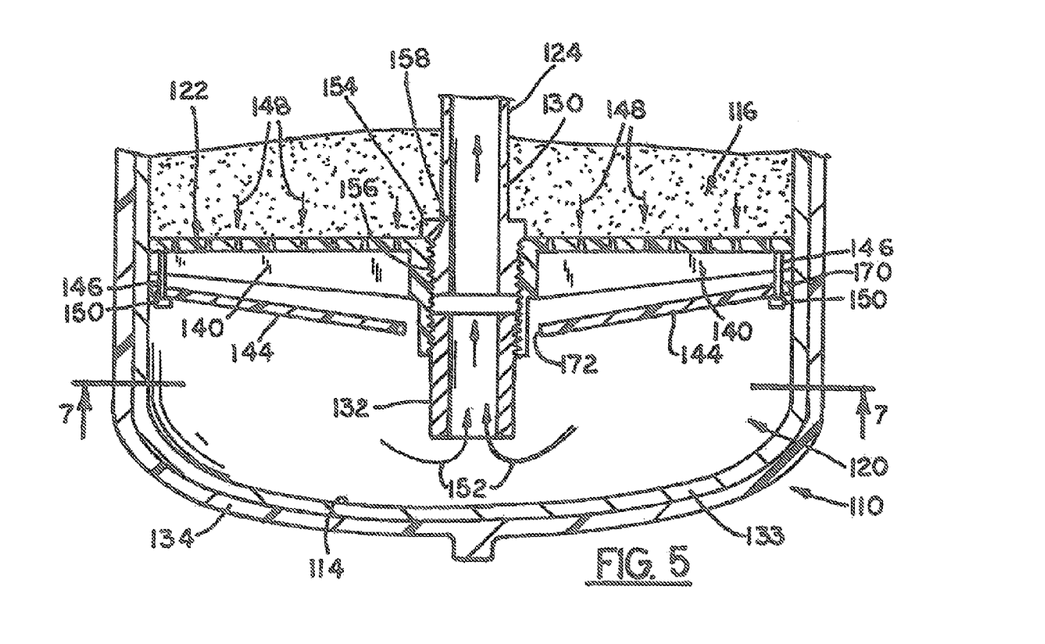
FIG. 5 is a fragmentary sectional side view of a bottom end of the pressure vessel constructed in accordance with a second embodiment of the invention, showing the valve plates thereof in a downflow position.
Figure 6:
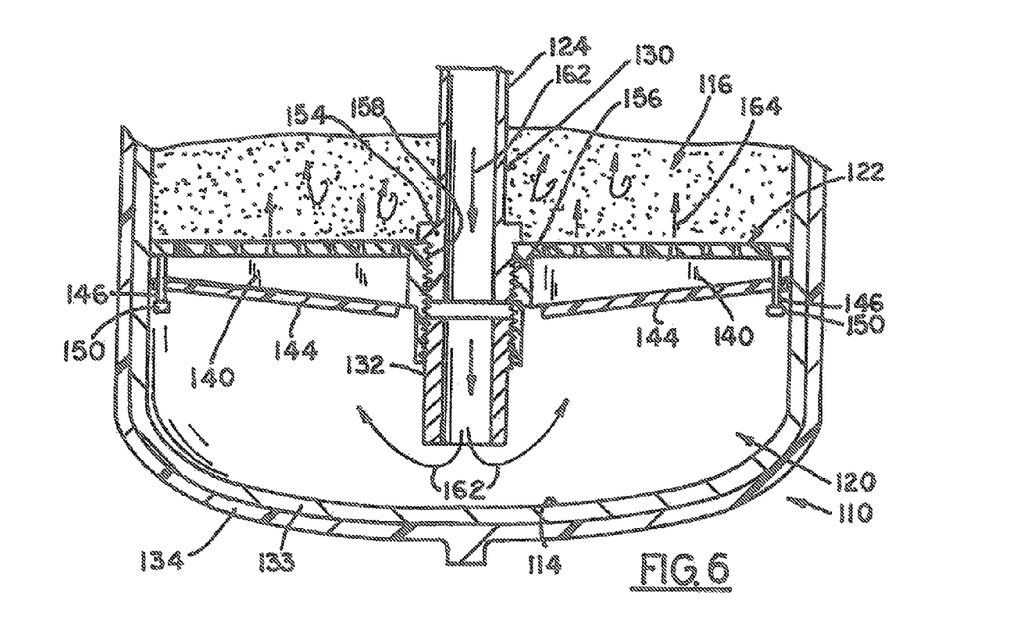
FIG. 6 is a fragmentary sectional side view of the bottom end of the pressure vessel of FIG. 5, showing the valve plates in an upflow position.
Figure 7:
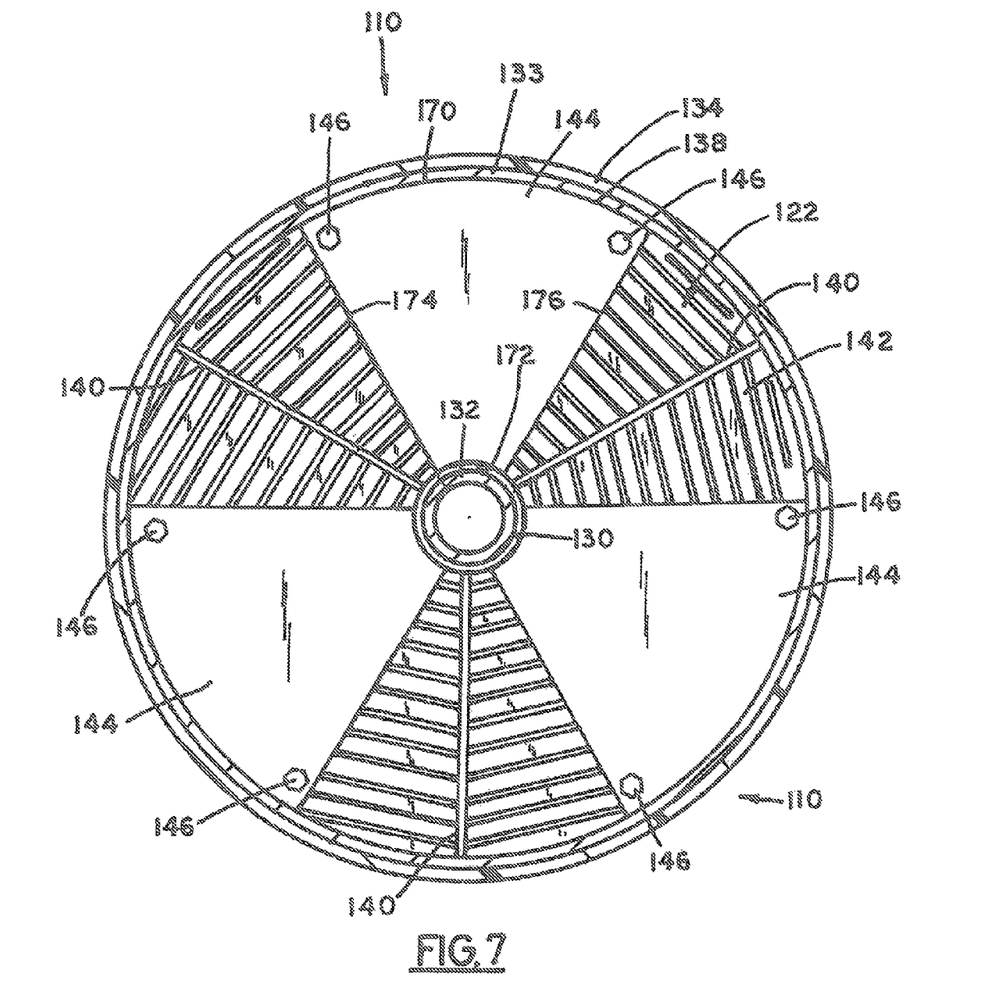
FIG. 7 is a sectional bottom plan view of the water softener pressure vessel of FIG. 5, taken generally along the lines 5-5 in FIG. 5.

Referring now to FIGS. 5-7, another embodiment of the distributor plate 122 according to the invention is illustrated. Unless otherwise indicated, the structures operate as previously described herein, and each of the structures is similarly numbered and incremented by 100. In particular, the distributor plate 122 of the present embodiment includes ribs 140 which are inclined relative to horizontal as may be best appreciated by reference to FIGS. 5 and 6. The inclined ribs provide improved support for the hub 136.

Referring initially to FIG. 5, the distributor plate 122 is shown during upflow operation. The valve plates 144 are thus positioned upwardly against the ribs 140 as in the first embodiment.

Now turning to FIG. 6, distributor plate 122 of the present embodiment is shown with the valve plates 144 moved to the lowered position during downflow or service operation. In particular, as the water falls downwardly through the resin tank 110, the valve plates 144 move downwardly under pressure of the water flowing through the resin bed 116 from above.

With reference now to FIG. 7, an exemplary arrangement of the valve plates 144 according to the second embodiment is shown. In particular, the slotted plate 142 of this embodiment is divided into twelve distinct segments by the ribs 140. Six evenly distributed valve plates 144 are provided, each of which is arranged to cover two adjacent segments and thus overlies three ribs 140. As in the previous embodiment, a number of alternative arrangements are envisioned and are within the scope of the invention.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments.

I claim:

1. A treatment tank for a fluid treatment system, comprising:
   a tank containing a bed of a fluid treatment media and a fluid;
   a distributor plate received in the tank and separating the bed from a lower end of the tank, and
   at least one valve plate covering a portion of and coupled to an underside of the distributor plate and configured to be selectively movable between a lowered position during a downflow operation and a raised position during an upflow operation, thereby permitting relatively unrestricted fluid flow therepast during downflow operation and at least substantially preventing fluid flow therepast during upflow operation.

2. The treatment tank of claim 1, wherein the distributor plate comprises,
   a central hub;
   an outer ring;
   a plurality of ribs extending between the hub and the outer ring and defining a plurality of segments therebetween;
   a slotted plate coupled between the hub, the outer ring, and the plurality of ribs; and
   wherein the valve plate is configured to cover a corresponding at least one of the plurality of segments.

3. The tank of claim 2, wherein the valve plate is coupled to the distributor plate by at least one pin coupled between the valve plate and at least one of the plurality of ribs.

4. The tank of claim 2, further comprising a riser tube extending longitudinally through the bed, the riser tube being attached to the central hub.

5. The tank of claim 1, wherein the valve plate is coupled to the distributor plate by at least one pin that passes through a hole in the valve plate so as to permit the valve plate to move vertically relative to the pin.

6. The tank of claim 5, wherein the pin has a head and a shaft that extends from an upper surface of the head to the distributor plate, the shaft being shorter than a thickness of the valve plate.

7. The tank of claim 1, wherein the valve plate is constructed from a material having a specific gravity that is less than a specific gravity of a fluid to be treated.

8. The tank of claim 7, wherein the fluid is water and the valve plate is constructed from polypropylene.

9. A distributor plate for a fluid treatment tank, the distributor plate comprising:
   a first fluid permeable plate configured to be received between a media bed and a lower end of the tank;
   at least one valve plate movably covering a portion of and coupled to an underside of the first plate and configured to be selectively movable between a lowered position during a downflow operation of the tank and a raised position during an upflow operation of the tank, thereby permitting relatively unrestricted fluid flow therepast during downflow operation and at least substantially preventing fluid flow therepast during upflow operation.

10. The distributor plate of claim 9, wherein the first plate comprises a slotted plate.

11. The distributor plate of claim 9, wherein the first plate further comprises a centrally positioned hub configured to be coupled to a riser tube disposed within the tank and an outer ring radially spaced from the hub and coupled to an inner wall of the tank.

12. The distributor plate of claim 11, wherein the first plate timber comprises a plurality of reinforcing ribs extending between the hub and the outer ring, and wherein the plurality of reinforcing ribs define a corresponding plurality of segments therebetween.

13. The distributor plate of claim 12, wherein the valve plate is configured to cover a corresponding at least one of the plurality of segments and to abut against associated reinforcing ribs during an upflow operation.

14. The distributor plate of claim 9, wherein the valve plate is coupled to the first plate by a pin comprising a head and a longitudinally extending shank, and wherein the head is configured to engage the valve plate when the valve plate moves to its lowered position.

15. The distributor plate of claim 9, wherein the valve plate is constructed from a material having a lower specific gravity than a specific gravity of a fluid being treated.

16. The distributor plate of claim 15, wherein the fluid being treated is water and the valve plate is constructed from polypropylene.

17. A method of operating a tank for a fluid treatment system, the method comprising the steps of:
   in response the downflow of fluid through the tank, lowering at least one valve plate covering and coupled to an underside of a distributor plate over at least a segment of the distributor plate, wherein the distributor plate is received between a media bed and a lower end of the tank to enable a generally evenly distributed unrestricted downflow of a fluid to the lower end of the tank from the media bed; and
   in response to the upflow of fluid trough the lank, raising the at least one valve plate to abut against the distributor plate and at least substantially prevent flow from the lower end to the media bed over the at least one segment.

18. The method of claim 17, wherein the step of lowering the at least one valve plate further comprises the step of engaging a head of pin coupled between the at least one valve plate and the distributor plate with the at least one valve plate to limit movement of the at least one valve plate away from the distributor plate.

19. The method of claim 17, wherein the at least one valve plate is constructed from a material having a lower specific gravity than a specific gravity of the fluid.

20. The method of claim 19, wherein the fluid is water and the at least one valve plate is constructed from polypropylene.

\* \* \* \* \*

UNITED STATES PATENT AND TRADEMARK OFFICE
CERTIFICATE OF CORRECTION

PATENT NO.         : 9,079,783 B2                                          Page 1 of 1
APPLICATION NO.    : 13/836448
DATED              : July 14, 2015
INVENTOR(S)        : Vaughan

It is certified that error appears in the above-identified patent and that said Letters Patent is hereby corrected as shown below:

IN THE CLAIMS

CLAIM 17, Line 11                    Replace "lank" with "tank"

Col. 8, Line 54

Signed and Sealed this
First Day of December, 2015

Michelle K. Lee
*Director of the United States Patent and Trademark Office*